Sept. 19, 1933.          W. H. SIMMONS          1,927,816
DUST SHIELD FOR BRAKE DRUMS
Filed June 5, 1929
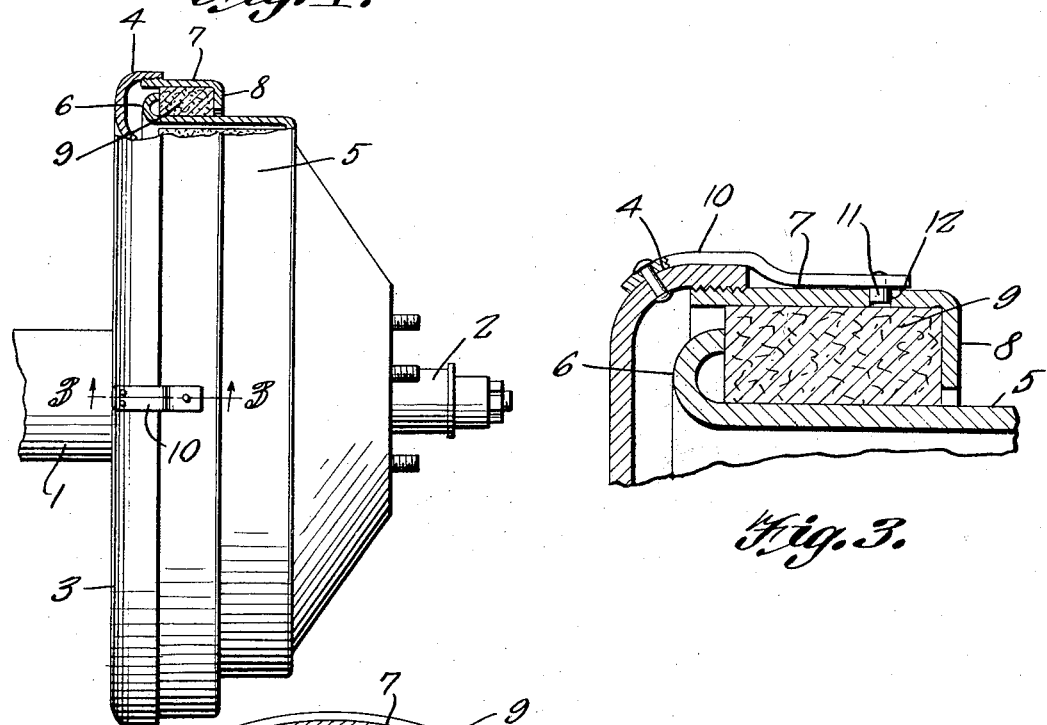
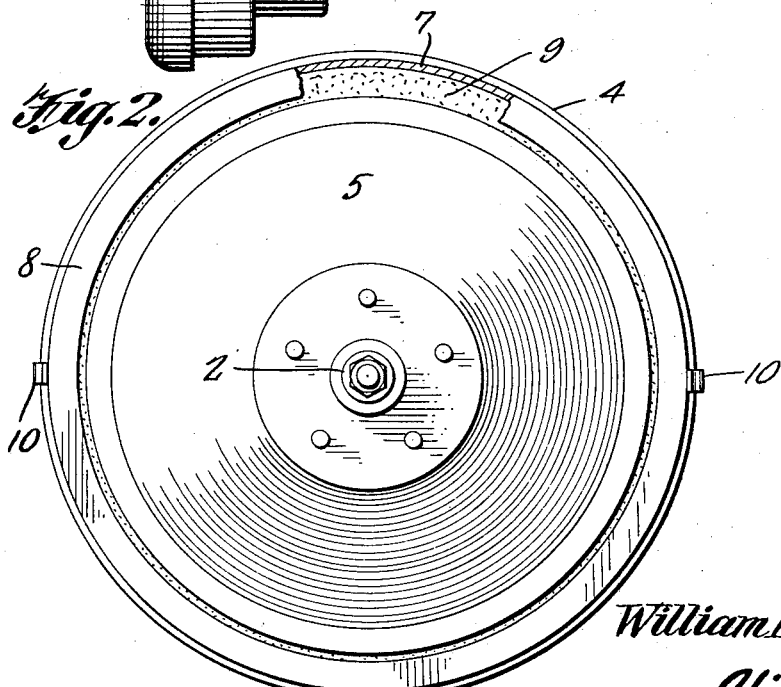
William H. Simmons,
INVENTOR
BY Victor J. Evans
ATTORNEY
WITNESS:

Patented Sept. 19, 1933

1,927,816

UNITED STATES PATENT OFFICE 1,927,816

DUST SHIELD FOR BRAKE DRUMS

William H. Simmons, Level Run, Va., assignor to Frank O. Hochmuth and Carl F. Otto, Detroit, Mich.

Application June 5, 1929. Serial No. 368,626

4 Claims. (Cl. 188—218)

In four-wheel brake constructions for certain types of automobiles, there is a considerable space between the inner beaded edge of the brake drum and the fixed inner brake housing plate therefor. This space permits of the entrance of dust, dirt, mud, water and the like which is very injurious to the braking mechanism and soon renders the same defective to the extent that the brake is rendered inoperable. It may, therefore, be considered the primary object of this, my present invention to provide a means which is easily attached to the brake housing plate and supported for light contact with the brake drum for effectively closing this space and thereby preventing the entrance of foreign matter to the drum and the brake mechanism.

To the attainment of the foregoing the invention consists in the improvement hereinafter described and definitely claimed.

In the drawing:

Figure 1 is a side elevation of a brake mechanism provided with the improvement, parts being broken away and parts being in section.

Figure 2 is a front elevation of the brake mechanism, parts being broken away and parts in section.

Figure 3 is a detailed enlarged sectional view approximately on the line 3—3 of Figure 1.

As my present invention does not relate to the brake mechanism which is arranged within the brake drum, no detail reference will be made to such mechanism.

Referring now to the drawing in detail, the numeral 1 designates the rear axle housing of an ordinary small type of automobile through which passes the shaft 2 upon which the wheel (not shown) is mounted. The housing 1 has fixed thereon, adjacent to the ends thereof, the brake housing plate 3 for the braking mechanism. The plate 3 is in the nature of a disc and has its edge flanged outwardly, as at 4. The brake drum of the braking mechanism is indicated by the numeral 5 and the inner and rounded or beaded end 6 of the said drum is received within and is spaced from the flange 4 of the plate 3. The drum, of course, rotates with the axle 2, and the outer face of the drum is of frusto conical formation, the straight end whereof being provided with the usual projecting stud bolts for attaching the wheel thereto.

It is to be noted that a considerable space is left between the bead 6 of the brake drum 5 and the flange 4 of the plate 3 and this space provides an entrance for foreign matter such as snow, dust, sleet, rain, etc., and such matter being directed onto the braking mechanism materially interferes with the proper operation thereof and causes a scraping between the braking parts which frequently results in serious injury thereto which is liable to not only render the brake inoperative but to necessitate the replacement of broken parts. My improvement, it will be noted, is of an extremely simple nature, the same comprising a ring 7 which has an outer inwardly directed flange 8. The ring has its outer periphery, opposite that formed with the flange 8, threaded and the inner face of the annular flange 4 of the plate 3 is also threaded for co-engagement with the threads of the ring or band 7. I interpose between the ring or band 7, the flange thereof and the bead 6 on the inner end of the brake drum 5 an annular compressible gasket 9. This gasket 9 fully closes the space between the bead 6 and the flange 4 and is held properly positioned by the flanged ring or band 7. The gasket 9 may be lubricated as there is a space between the inner periphery of the flange 8 of the ring or band 7 and the outer periphery of the brake drum.

In order to prevent the flanged band 7 from turning I rivet, at spaced intervals on the outer face of the flange 4 spring arms 10 which are rounded and formed with straight extensions to overlie and frictionally contact with the band 7. These extensions are formed with lugs 11 that enter openings 12 in the outer face of the ring or band 7.

It is believed the simplicity of the construction and the advantages thereof will be understood and appreciated by those skilled in the art to which such invention relates so that further detailed description will not be required.

Obviously I do not wish to be restricted to the precise details herein set forth and, therefore, hold myself entitled to make such changes therefrom as fairly fall within the scope of what I claim.

Having described the invention, I claim:

1. The combination with a brake mechanism for vehicles including a brake drum and a disc brake housing plate arranged opposite the inner face of the drum, which has a peripherally outwardly directed flange extending over the inner end of the drum; of a compressible gasket surrounding the drum for closing the space between the flange of the brake housing plate and drum and means removably secured to the flange of the plate for holding said gasket positioned.

2. The combination with a brake mechanism of an automobile including a brake drum having its inner edge rounded to provide a bead, and a disc-shaped brake housing plate which has its periphery formed with an outwardly extending flange that is spaced from the bead, of a compressible gasket arranged around the drum and contacting with the bead, and a band threadedly engaging with the inner periphery of the flange and said band having an outer flange to contact with the outer face of the gasket, and spring arms fixed on the flange of the plate having extensions which overlie and frictionally contact with the band, lugs on said extensions and said band having openings to receive the lugs therein.

3. A brake seal comprising in combination, a stationary brake housing having an annular flange, a rotatable brake drum having an annular flange extending adjacent the flange of the brake housing, a metal band shaped to fit the annular flange of the brake housing and secured thereto, the metal band having an inwardly extending flange and a packing member carried by the flange of the metal band and riding in contact with the periphery of the brake drum.

4. A brake seal comprising in combination, a stationary brake housing having a peripheral flange, a rotatable brake drum having a peripheral flange extending adjacent the flange of the brake housing, a metal band detachably secured to the peripheral flange of the brake housing and a packing ring secured to the metal band and riding in contact with the peripheral flange of the brake drum.

WILLIAM H. SIMMONS.